(12) United States Patent
Schickel et al.

(10) Patent No.: US 10,731,823 B2
(45) Date of Patent: Aug. 4, 2020

(54) COMPOSITE LENS ARRANGEMENT OF A LIGHT ASSEMBLY FOR LIGHT COLLECTION AND BEAM SHAPING

(71) Applicant: VARROC LIGHTING SYSTEMS S.R.O., Šenov u Nového Jičína (CZ)

(72) Inventors: Dylan Schickel, Belleville, MI (US); Chung-Yuan Wu, Ann Arbor, MI (US); Colby Childress, Novi, MI (US)

(73) Assignee: VARROC LIGHTING SYSTEMS, S.R.O., Senov U Noveho Jicina (CZ)

( * ) Notice: Subject to any disclaimer, the term of this patent is extended or adjusted under 35 U.S.C. 154(b) by 0 days.

(21) Appl. No.: 15/938,692

(22) Filed: Mar. 28, 2018

(65) Prior Publication Data

US 2019/0301705 A1 Oct. 3, 2019

(51) Int. Cl.
| | |
|---|---|
| *F21V 5/00* | (2018.01) |
| *F21S 41/275* | (2018.01) |
| *F21S 43/20* | (2018.01) |
| *F21S 41/143* | (2018.01) |
| *F21S 43/14* | (2018.01) |
| *F21S 41/20* | (2018.01) |
| *F21Y 115/10* | (2016.01) |

(52) U.S. Cl.
CPC ............ *F21V 5/007* (2013.01); *F21S 41/143* (2018.01); *F21S 41/275* (2018.01); *F21S 41/285* (2018.01); *F21S 43/14* (2018.01); *F21S 43/26* (2018.01); *F21Y 2115/10* (2016.08)

(58) Field of Classification Search
CPC ....... F21V 5/007; F21S 41/143; F21S 41/275; F21S 41/285; F21S 43/14; F21S 43/26
See application file for complete search history.

(56) References Cited

U.S. PATENT DOCUMENTS

| | | | |
|---|---|---|---|
| 6,367,950 B1* | 4/2002 | Yamada | F21V 5/04 362/245 |
| 6,724,543 B1 | 4/2004 | Chinniah et al. | |
| 7,207,700 B2 | 4/2007 | Fallahi et al. | |
| 7,419,287 B2 | 9/2008 | Gasquet | |
| 7,618,160 B2 | 11/2009 | Chinniah et al. | |
| 8,215,814 B2 | 7/2012 | Marcoux | |
| 9,156,395 B2 | 10/2015 | Kumar et al. | |

(Continued)

FOREIGN PATENT DOCUMENTS

| | | |
|---|---|---|
| DE | 10010227 A1 | 9/2000 |
| EP | 2012056 A1 | 1/2009 |

(Continued)

*Primary Examiner* — Thomas M Sember
(74) *Attorney, Agent, or Firm* — Cantor Colburn LLP

(57) ABSTRACT

A composite lens arrangement for use with a light emitting source directed along an optical axis includes a collimator lens, a beam former lens, a first optical structure, and a member. The collimator lens includes a light collection surface axially opposed to the light emitting source, and an opposite facing light emitting surface. The beam former lens is spaced axially from the light emitting surface, and includes a light collection face axially opposed to the light emitting surface and an opposite light emitting face. The first optical structure is integral to one of the light emitting surface and the light collection face. The member is radially spaced from the optical axis, and extends between, and is attached to, the light emitting surface and the light collection face.

14 Claims, 3 Drawing Sheets

(56) References Cited

U.S. PATENT DOCUMENTS

| | | |
|---|---|---|
| 2004/0080835 A1 | 4/2004 | Chinniah et al. |
| 2007/0064431 A1 | 3/2007 | Fallahi et al. |
| 2008/0043466 A1* | 2/2008 | Chakmakjian .......... F21V 5/007 362/237 |
| 2015/0078029 A1 | 3/2015 | Kumar et al. |

FOREIGN PATENT DOCUMENTS

| | | |
|---|---|---|
| FR | 2943400 A1 | 9/2010 |
| FR | 2952163 A1 | 5/2011 |

* cited by examiner

COMPOSITE LENS ARRANGEMENT OF A LIGHT ASSEMBLY FOR LIGHT COLLECTION AND BEAM SHAPING

BACKGROUND

The present disclosure relates to a light assembly, and more particularly, to a light assembly including a composite lens arrangement adapted to shape light emitting beams.

Traditional optical systems, such as those used for automotive lamps and particularly those for high intensity signaling functions (e.g., stop, turn) and illumination functions (e.g., DRL, fog, high beam, low beam) are often accomplished via Light Emitting Diodes (LED) as the light source. Collimator/collection lenses are often used for collecting the light rays from the LED(s), and arranging the light rays in a substantially parallel orientation (i.e., collimation). After arranging the rays in a substantially parallel orientation, several different optical tasks may need to be performed to complete the fully operational optical function.

One task may include a correction of optical axis in the case that the mechanical axis of the LED is different than the intended optical axis of the output beam. Another task may include the distribution of the rays to form the desired light output pattern (i.e., beam shaping and forming). Yet a third task may include a correction of dispersion (i.e., color separation) caused by the variability of the index of refraction with regard to the source wavelength. It is currently difficult to perform all of the necessary tasks, or functions, with optics disposed on a single output surface of a primary lens, thus secondary optical components may be applied in the construction of a multi-part optical system.

Unfortunately, such construction may require additional specialized molds and assembly steps, may require substantial package depth, may require LED's on different planes at high cost, some components may need a secondary metallization process. All of this can contribute toward a complex assembly (i.e., difficult to align LED and all components to a common optical axis, and may cause a lower total operational optical efficiency. Accordingly, it is desirable to provide a simpler and less expensive optical system that may be capable of high speed mass production.

SUMMARY

In one exemplary, non-limiting, embodiment of the present disclosure, a composite lens arrangement is used with a light emitting source directed along an optical axis. The composite lens arrangement includes a collimator lens, a beam former lens, a first optical structure, and a member. The collimator lens includes a light collection surface axially opposed to the light emitting source, and an opposite facing light emitting surface. The beam former lens is spaced axially from the light emitting surface, and includes a light collection face axially opposed to the light emitting surface and an opposite light emitting face. The first optical structure is integral to one of the light emitting surface and the light collection face. The member is radially spaced from the optical axis, and extends between, and is attached to, the light emitting surface and the light collection face.

In another embodiment, a composite lens arrangement is for use with a light emitting source directed along an optical axis. The composite lens arrangement includes a collimator lens, a beam former lens, a beam spreading optical structure, an axial correction optical structure, and a member. The collimator lens includes a light collection surface axially opposed to the light emitting source and an opposite facing light emitting surface. The beam former lens is spaced axially from the light emitting surface, and includes a light collection face axially opposed to the light emitting surface and an opposite light emitting face. The beam spreading optical structure is integral to one of the light emitting surface and the light collection face. The axial correction optical structure is integral to the other of the light emitting surface and the light collection face. The member is radially spaced from the optical axis, and extends between, and is attached to, the light emitting surface and the light collection face.

In another embodiment, a light assembly includes a non-optical outer lens, a housing, and a plurality of illuminating composite lens assemblies. The non-optical outer lens is adapted to transmit a light beam along a beam axis. The housing and the non-optical outer lens define a cavity. The plurality of illuminating composite lens assemblies each include a central axis, an output optical surface, an input optical face spaced axially from and opposed to the output optical surface, and an output optical face opposite to and spaced axially from the input optical face. Each one of the plurality of illuminating composite lens assemblies are adapted to reflect respective light rays through the optical surface, through the output optical face, and through the input optical face for re-orientating the respective light rays generally parallel to the beam axis, and the central axes being parallel to one-another and angularly offset from the beam axis.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
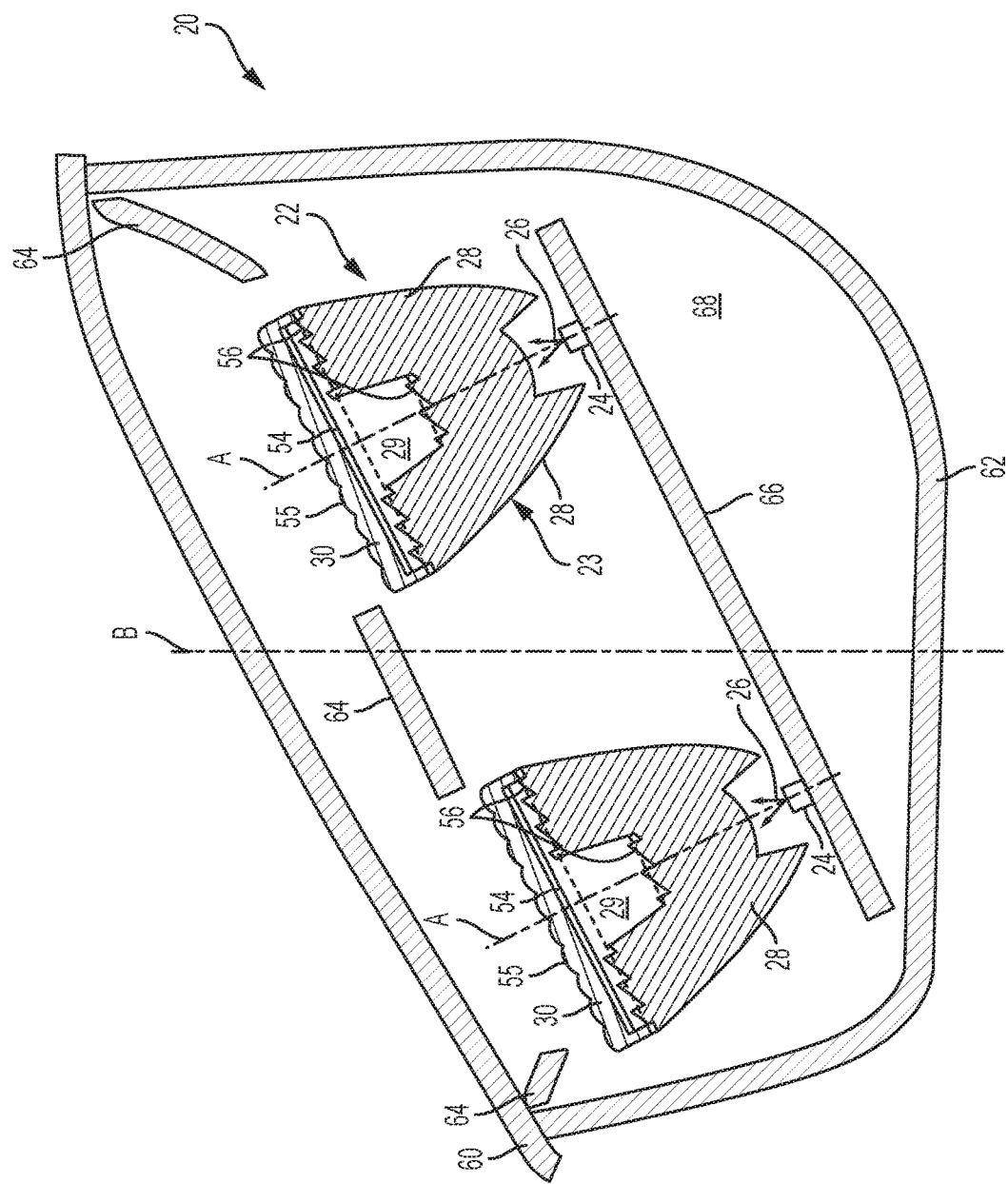
FIG. 1 is a cross section of a light assembly as one, non-limiting, exemplary embodiment of the present disclosure.

Referring now to the Figures, where the invention will be described with reference to specific embodiments, without limiting same, a light assembly 20 is illustrated. As best shown in FIG. 1, the light assembly 20 may include at least one illuminating composite lens assembly 22 each having a composite lens arrangement 23 and a light emitting source 24. The composite lens arrangement 23 is adapted to collect light rays 26 from the light emitting source 24, internally transmit the light rays, and emit the light rays. The composite lens arrangement 23 is designed generally along an optical axis A. Examples of a light emitting source 24 include a Light Emitting Diode (LED) and a laser diode.

Referring to FIGS. 1-4, the composite lens arrangement 23 of the composite lens assembly 22 includes a collimator lens 28, a beam former lens 30, and an attachment member 32 adapted to attach the collimator lens 28 to the beam former lens 30. The beam former lens 30 may be substantially planar, may be normal to optical axis A, and may be spaced axially from the collimator lens 28. The collimator lens 28 and the beam former lens 30 each include boundaries that, at least in-part, define a gap 34 located axially between the lenses 28, 30. In one example, the gap 34 may be an air gap. In another example, the gap may be, or may be generally filled with, a material having a refractive index sufficiently different than that of the collimator lens 28 and the beam former lens 30. In one embodiment, the gap 34 may be substantially planar and normal to the optical axis A.

The attachment member 32 is generally adapted to attach the collimator lens 28 to the beam former lens 30 of the composite lens arrangement 23. Examples of the attachment member 32 may include a collar, an adhesive, a weld, or any other attachment means capable of supporting an axially separation between the collimator lens 28, and the beam former lens 30. In one embodiment, the member 32 may be a plurality of members and/or stanchions circumferentially spaced from one-another, and each spaced radially outward from the optical axis A. In another embodiment, the member example of a collar may be circumferentially continuous, concentric to optical axis A, and attached to respective peripheries of the collimator lens 28 and the beam former lens 30. In the member example of a weld, the weld may be a spot or a continuous weld and/or may be formed from plastic welding, staking, laser welding, ultrasonic welding, infrared welding, heated tool welding, vibration welding, hot plate welding, hot air/cold tool welding, and others. In yet other examples, the collimator lens 28, the beam former lens 30, and the member 32 may be formed as one, unitary, and homogeneous piece via a machining process, injection molding, additive manufacturing, and other processes. It is further contemplated and understood, that the member 32 may be a fastener carried between the collimator lens 28 and the beam former lens 30, enabling a mechanical fastening (e.g., snap fit) of the lenses 28, 30.

In the process example of laser welding the beam former lens 30 to the collimator lens 28, the process may employ a Thulium fiber laser source having an operational wavelength of approximately 1940 nm, or other suitable laser source, providing a simplified, compact, weld joint between two optically transparent polymeric materials.

The collimator lens 28 of the composite lens arrangement 23 may be substantially located concentrically about the optical axis A, and may include, or carry, light collection surfaces 36, 37 (i.e., optical surface), a light emitting surface 38 (i.e., optical surface), and an outer wall 40 substantially facing radially outward with respect to axis A. The light collection surface 36 may substantially face axially toward the light emitting source 24, and may be arcuate and convex in shape (e.g., generally hemispherical), for collection of the light rays 26 from the light emitting source 24. The light collection surface 37 may be circumferentially continuous, faces radially inward, and may substantially span axially between, and congruently forms into, the light collection surface 36 and the outer wall 40. The light emitting surface 38 may be substantially normal to the optical axis A, and may have a substantially round periphery 44 concentrically located to the optical axis A.

The outer wall 40 is located radially outward from the light collection surface 37, and substantially extends axially between the light emitting surface 38 and the light collection surface 37. In one embodiment, the outer wall 40 is circumferentially continuous, and may have a generally rotated parabolic shape (e.g., circular paraboloid shape). The light collection surface 37 may substantially span axially between the outer wall 40 and the light collection surface 36. In one embodiment, the light collection surface 37 may be circular, may be circumferentially continuous, and may have a conical frustum shape that radially converges in a forward axial direction away from the light emitting source 24. The light collection surface 36 and the light collection surface 37 may include boundaries that define a pocket 48 (see FIG. 4) for receipt and or orientation of the light emitting source 24. The light collection surfaces 36 and 37 are oriented so as to collect a majority of the light rays 26 emitted from the light source 24. Furthermore, the light collection surface 36, and/or the outer wall 40, may be shaped such that each light ray 26 becomes substantially oriented along the optical axis A before reaching the light emitting surface 38.

The light emitting surface 38, may have an orientation substantially perpendicular to the optical axis A. The light emitting surface 38 may include, or may carry, a plurality of optical structures 56 (i.e., shapes) that generally begin the task of aligning the light rays 26 into particular orientations and distributions to support shaping the emitted beam to meet the requirements of the intended application. In one embodiment, the optical structures may be barbed structures aligned side by side. Each barbed structure may include a common incident angle.

The collimator lens 28 may, in some embodiments, may include an inner wall 42 and a secondary light emitting surface 39 (i.e., optical surface) each including boundaries that define a cavity 29 in fluid communication through the light emitting surface 38 of the collimator lens 28. The cavity 29 may be formed to reduce the wall thickness of collimator lens 28, thus facilitating manufacturing of the lens via injection molding. In those particular embodiments, the cavity 29 may be formed when the secondary light emitting surface 39 (i.e., a central portion of the light emitting surface 38) is displaced rearward towards the light source 24. Surface 39 may be oriented substantially parallel to surface 38, may be substantially circular in shape and may be axially separated from surface 38 by the inner wall 42. Inner wall 42 may be of a truncated conical frustum shape with the taper oriented to facilitate injection molding of the collimator lens 28.

The beam former lens 30 of the composite lens arrangement 23 may include an input optical face 50 and an output optical face 52. The input optical face 50 may be substantially parallel to, and spaced axially from, the light emitting surface 38 of the collimator lens 28. The output optical face 52 is generally opposite to, and may be substantially parallel to, the input optical face 50. The light emitting surface 38 of the collimator lens 28 and the input optical face 50 of the beam former lens 30 may define the gap 34. The gap 34 enables the use of refractive optics on the light emitting surfaces 38 and 39 and the input optical face 50.

One novel feature of the present disclosure may be the inclusion of generally one optical surfaces 38, 39 and two optical faces 50, 52 of the composite lens arrangement 23, through which each light ray 26 passes for the purpose of beam shaping, or correction, after the rays are collected and substantially collimated by their interaction with surfaces 37 and 40, or alternately surface 36. The beam forming optical surface(s) 38, 39 and optical faces 50, 52 may be explicitly independent from the light collection surfaces 36, 37. In many embodiments, optical structures may perform a similar function, may be of a similar construction, and may be used on surfaces 38, 39 in the case that cavity 29 is introduced into the design. For simplicity in the ongoing description of surfaces 38, 39, light collection surfaces 36, 37, along with outer wall 40, may orientate all of the light rays 26 such that the rays pass through either surface 38, or surface 39, but not both. By providing separate surfaces and/or faces for different optical tasks, the necessary optical structures may be more simply and precisely designed and manufactured, leading to greater precision in forming the desired beam without the need of additional optical components in the lamp system.

As explained, the composite lens arrangement 23 of the illuminating composite lens assembly 22 may be used to form many different light beams for use in many different applications. The applications specific desired beam may be formed by locating various optical structures on the optical surfaces 38, 39 and optical faces 50, 52 for the purpose of directing the light rays 26 into a desired pattern (i.e., beam shaping).

Figure 2:
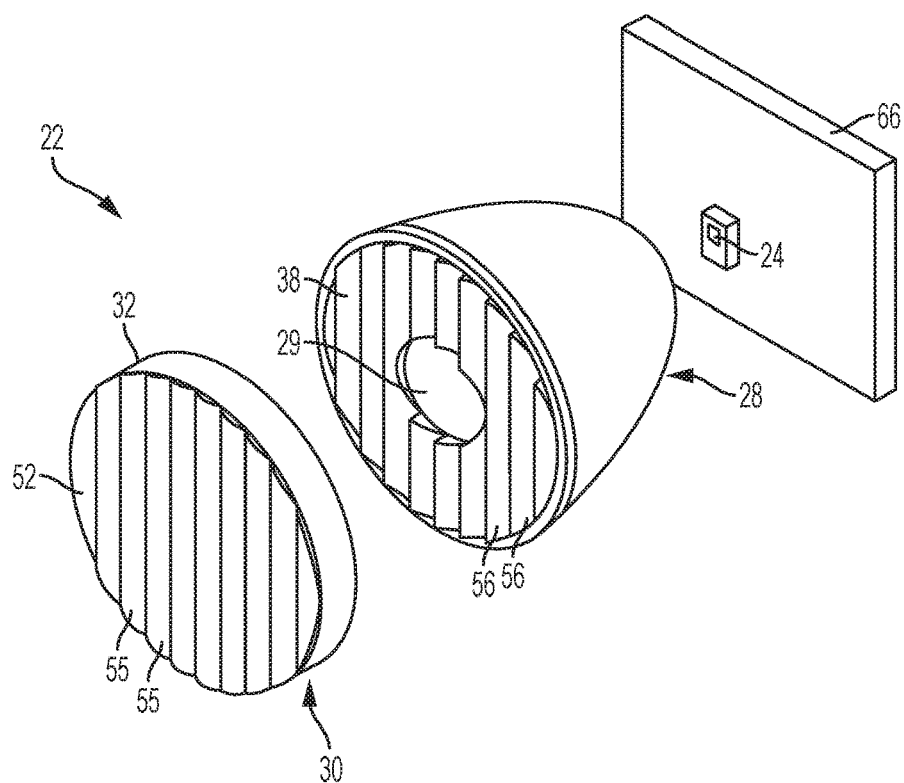
FIG. 2 is a disassembled, perspective, front view of an illuminating composite lens arrangement of the light assembly.
Figure 4:
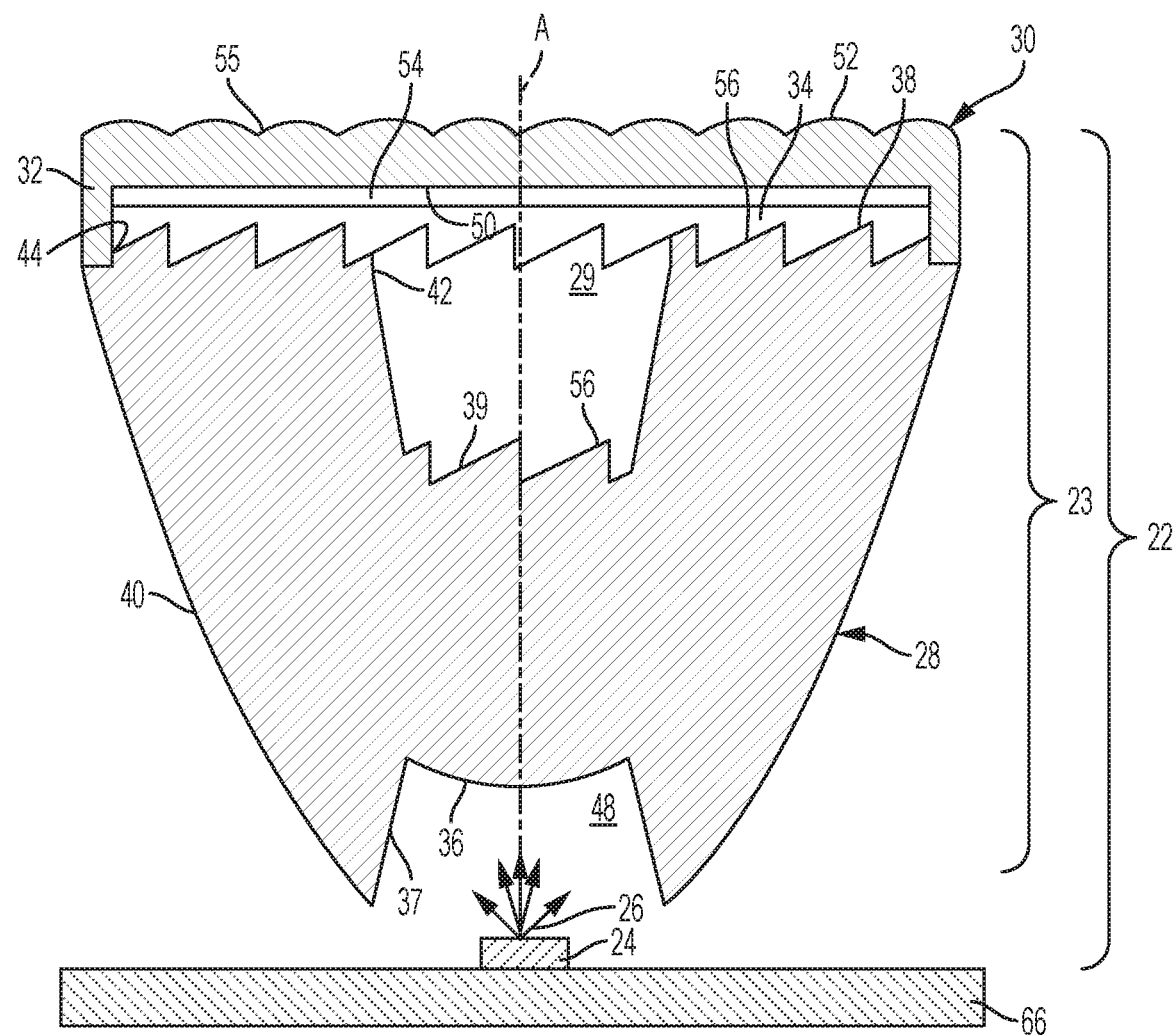
FIG. 4 is a cross section of illuminating composite lens arrangement.

For example, one or two of the optical surfaces 38, 39 and optical faces 50, 52 may include a plurality of beam spreading optical structures 54 and 55, while another of the surfaces may include an axial correction optical structure 56. As shown in FIGS. 2 and 4, the axial correction optical structures 56 may be carried, or defined, by the light emitting surfaces 38, 39 of the collimator lens 28. The beam spreading optical structures 54, 55 may be carried by the respective optical faces 50, 52 of the beam former lens 30. The beam spreading optical structures 54, 55 are adapted to redistribute the light rays 26, which originate from a relatively narrow, or small, light emitting source 24, into a wider beam that is useful in many optical applications.

Figure 3:
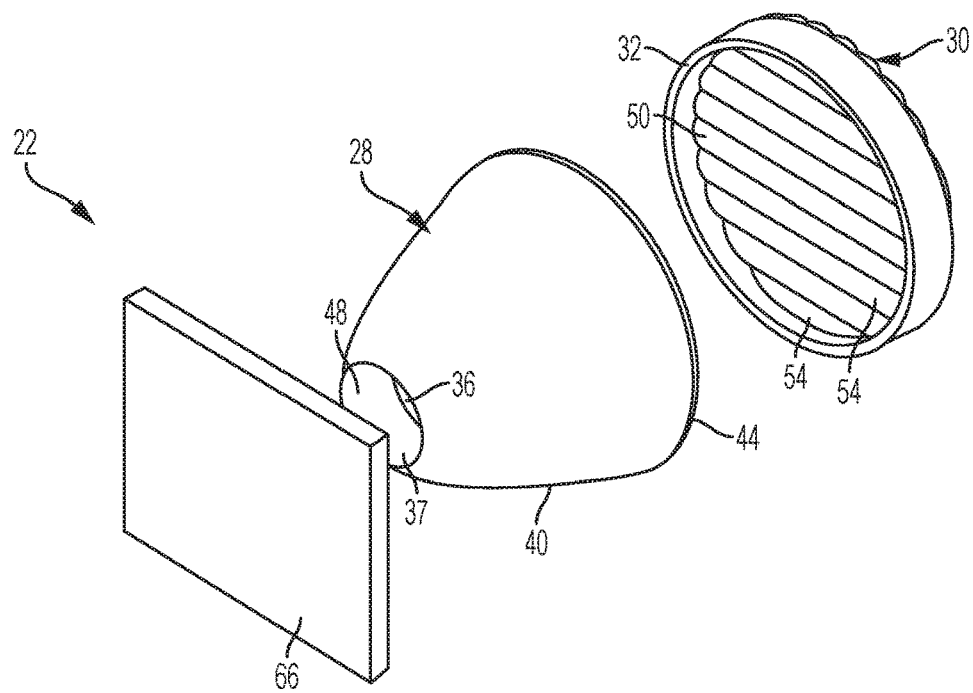
FIG. 3 is a disassembled, perspective, rear view of the illuminating composite lens arrangement of the light assembly.

The axial correction optical structure 56 may be adapted to re-orient an angular distribution of the light rays 26 if the central axis of the light emitting source 24 (i.e., optical axis A) is different than a desired axis (i.e., light beam axis B) for an output beam of the light assembly 20, see FIG. 1. In the aforementioned embodiment, and as best shown in FIGS. 2 through 4, the beam spreading optical structures 54 of the input optical face 50 may include horizontally oriented flute shaped features, and the beam spreading optical structures 55 of the output optical face 52 may include vertically oriented flute shaped features.

In the same embodiment, and as best shown in FIGS. 2 and 4, the axial correction optical structures 56 may include a multitude of wedge shaped features disposed on light emitting surfaces 38, 39. The example shown is illustrative only, and the construction, orientation, placement, and arrangement of various optical structures onto the surfaces 38, 39 and faces 50, 52 may be interchanged as necessary for optimization of optical efficiency in the desired application with little effect on the manufacturability, size, shape, or overall construction of the composite lens assembly 22.

In alternate embodiments, optical structures may be employed on one or more of the surfaces 38, 39 and faces 50, 52 in order to correct for non-desirable features of the formed beam that occur as a result of the interaction of the light rays 26 with other optical structures or the lenses themselves. Use of independent optical structures for a correction function in addition to the structures for the beam shaping functions enables considerable design flexibility with a higher quality result. One non-limiting example of this would be the use of micro-scale optical structures disposed on the output optical face 52 to correct for the dispersion effect that occurs when light composed of a plurality of wavelengths (e.g. white light) passes through optical parts made from dispersive media and the component wavelengths of the light are differently refracted due to the dependence of the index of refraction on wavelength. Some other, non-limiting examples of correction structures might include those intended to mitigate hot spot intensity, modify the sharpness of a gradient image, improve optical efficiency by recycling errant rays, or homogenize the lit appearance.

It is understood and contemplated that any variety of optical structures may be employed on the various optical surfaces 38, 39 and/or optical faces 50, 52. Some non-limiting examples of optical structures that may be used in addition to those illustrated and mentioned above include pillow optics, complex sub-lens arrays, dot patterns, free-form complex optical shapes, micro optics, diffusing films, and/or a diffusing texture. Such structures may be employed in combinations uniquely enabled by the important features of the invention. By using unique combinations of well-known optical structures in this novel construction, it is enabled to form a complete and corrected beam for many optical applications from the composite lens 22 without the need or complexity of additional optical components in the larger system.

The composite design of lens arrangement 23, which is composed of collimator lens 28 and beam former lens 30, may be constructed such that the forming of the optical structures on surfaces 38, 39 and faces 50, 52 is completed in a main manufacturing direction generally aligned with the optical axis A but without the need of the forming action to avoid other surfaces or structures of the device. In one embodiment, this forming is completed using injection molding and the main mold directions for both lenses 28 and 30 are generally aligned with the optical axis A. This allows the optical structures 54, 55, 56 to be formed in the main mold directions along with the light collection surfaces 36, 37. Use of a single mold direction may result in a simpler manufacturing process and tooling and yields a more cost-effective and reliable product well suited for high speed manufacturing. In an alternate embodiment, secondary mold directions may be used to form substantially more complex optical structures on surfaces such as 36, 37, 38, 39, 40, and faces 50, 52 allowing even more design flexibility to accomplish optical functions.

The collimator lens 28 may be molded from a translucent optical polymer. The substantially flat beam former lens 30 may also be molded from a translucent optical polymer, or from a diffusive material to hide the functional optics when in an unlit state and provide a uniformly lit forward-facing output optical face 52. If desired, the uniformity of such a construction may be enhanced with specific optical structures employed on surface 38 and/or face 52. Examples of a transparent polymer may include Polymethylmethacrylate (PMMA), Polycarbonate (PC), Cyclic Olefin co-polymer (COP), and any other suitable transparent polymer. Diffusive materials are typically based on the same optically transparent polymers with special additives and are well known.

The optical structures 54, 55, 56 may be an integral part of (i.e., formed into) the light emitting surfaces 38, 39 of the collimator lens 28, and/or the input and output optical faces 50, 52 of the beam former lens 30. Such optical structures may be formed integrally with their parent components (i.e., lenses 28 or 30) or may be added using well known secondary processes such as vacuum coating, ink jet or gravure printing, or additive manufacturing.

Applications of the composite lens assembly 22 may include small, compact, lamps or functional modules inside lamps where space saving and function is emphasized. Any remaining space on, for example, a vehicle may then be used for other packaging needs (i.e., styling, form, signature functions). Specific applications may include a variety of compact automotive lamps that may fulfill the requirements of government regulations. Such compact, low cost, lamps may include: a stop lamp, a direction indicator lamp, a reversing indicator lamp, a sidemarker lamp, a low beam, a high beam, a daytime running lamp, a front fog lamp, a rear fog lamp, a license plate lamp, and others.

Referring further to FIG. 1, the light assembly 20 is illustrated as a vehicle lamp assembly with a plurality of composite lens assemblies 22 (i.e., two illustrated). The light assembly 20 may further include a non-optical outer lens 60, a housing 62 that may be opaque, a bezel 64, and a mounting board 66 that may be a printed circuit board. The housing 62 and the non-optical outer lens 60 may include boundaries that define a generally enclosed cavity 68. The lens assemblies 22, the bezel 64 and the bezel 64, and the board 66 may be located in the cavity 68 and spaced behind the non-non-optical outer lens 60. The outlet face 52 of each beam former lens 30 may be exposed through the bezel 64 that may be opaque. The board 66 may be generally hidden behind the bezel 64, and may not be viewed through the non-optical outer lens 60.

The light assembly is adapted to emit a beam of light axially directed along axis B that may be aligned with the direction of vehicle travel. In one embodiment, axis B may be angularly offset from axis A by an amount accounted for in the design of the optical structure 56 of each lens arrangement 23. In one embodiment, the light sources 24 of each composite lens assembly 22 may be mounted to the common board 66. In one embodiment, the board 66 may be substantially planar and disposed substantially normal to each axis A, which may be substantially parallel to one-another.

Advantages and benefits of the present disclosure include a composite lens arrangement 23 of a compact design with a multitude of surfaces and/or faces capable of beam manipulation, resulting in a reduction in optical components/parts, and a design that supports reusability across different products and models by only changing optics on the beam former lens 30 and perhaps the collimator lens 28 which may easily be accomplished via an injection molding process. The compact and simple geometric nature of the composite lens arrangement 23 enables high speed automation, thereby reducing cost. The implementation of a singular or multiple composite lenses to provide all of the optical components necessary enables the compact construction of illuminating composite lens assemblies 22 that may be adapted to a wide array of styling options.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A composite lens arrangement for use with a light emitting source directed along an optical axis, the composite lens arrangement comprising:
    a collimator lens including a light collection surface axially opposed to the light emitting source and an opposite facing light emitting surface;
    a beam former lens spaced axially from the light emitting surface, and including a light collection face axially opposed to the light emitting surface and an opposite light emitting face;
    a first optical structure integral to one of the light emitting surface and the light collection face;
    a member radially spaced from the optical axis, and extending between and attached to the light emitting surface and the light collection face; and
    a second optical structure integral to the light emitting face.

2. The composite lens arrangement set forth in claim 1, further comprising:
    a third optical structure integral to the light collection face, wherein the first optical structure is integral to the light emitting surface.

3. The composite lens arrangement set forth in claim 1, wherein the beam former lens is substantially planar and normal to the optical axis.

4. The composite lens arrangement set forth in claim 1, wherein the member is a plurality of circumferentially spaced spot welds.

5. A composite lens arrangement for use with a light emitting source directed along an optical axis, the composite lens arrangement comprising:
    a collimator lens including a light collection surface axially opposed to the light emitting source and an opposite facing light emitting surface;
    a beam former lens spaced axially from the light emitting surface, and including a light collection face axially opposed to the light emitting surface and an opposite light emitting face;
    a first optical structure integral to one of the light emitting surface and the light collection face; and
    a member radially spaced from the optical axis, and extending between and attached to the light emitting surface and the light collection face, wherein the member is a circumferentially continuous collar.

6. The composite lens arrangement set forth in claim 1, wherein the member is an adhesive.

7. The composite lens arrangement set forth in claim 1, wherein the light emitting surface and the light collection face define a gap.

8. The composite lens arrangement set forth in claim 1, wherein the collimator lens includes an outer wall facing radially outward, and having a generally rotated parabolic shape.

9. The composite lens arrangement set forth in claim 1, wherein the collimator lens includes an outer wall facing radially outward and an opposite inner wall, the inner wall and the light collection surface defining a pocket for placement of the light emitting source.

10. The composite lens arrangement set forth in claim 9, wherein the outer wall is a generally rotated parabolic shape.

11. The composite lens arrangement set forth in claim 10, wherein the inner wall has a conical frustum shape.

12. A composite lens arrangement for use with a light emitting source directed along an optical axis, the composite lens arrangement comprising:
    a collimator lens including a light collection surface axially opposed to the light emitting source and an opposite facing light emitting surface;
    a beam former lens spaced axially from the light emitting surface, and including a light collection face axially opposed to the light emitting surface and an opposite light emitting face;

a beam spreading optical structure integral to one of the light emitting surface and the light collection face;
an axial correction optical structure integral to the other of the light emitting surface and the light collection face; and
a member radially spaced from the optical axis, and extending between and attached to the light emitting surface and the light collection face.

13. The composite lens arrangement set forth in claim 12, further comprising:
a third optical structure integral to the light emitting face.

14. The composite lens arrangement set forth in claim 12, wherein the beam former lens along with one of the beam spreading optical structure and the axial correction optical structure is made of a single injection molded part.

* * * * *